UNITED STATES PATENT OFFICE.

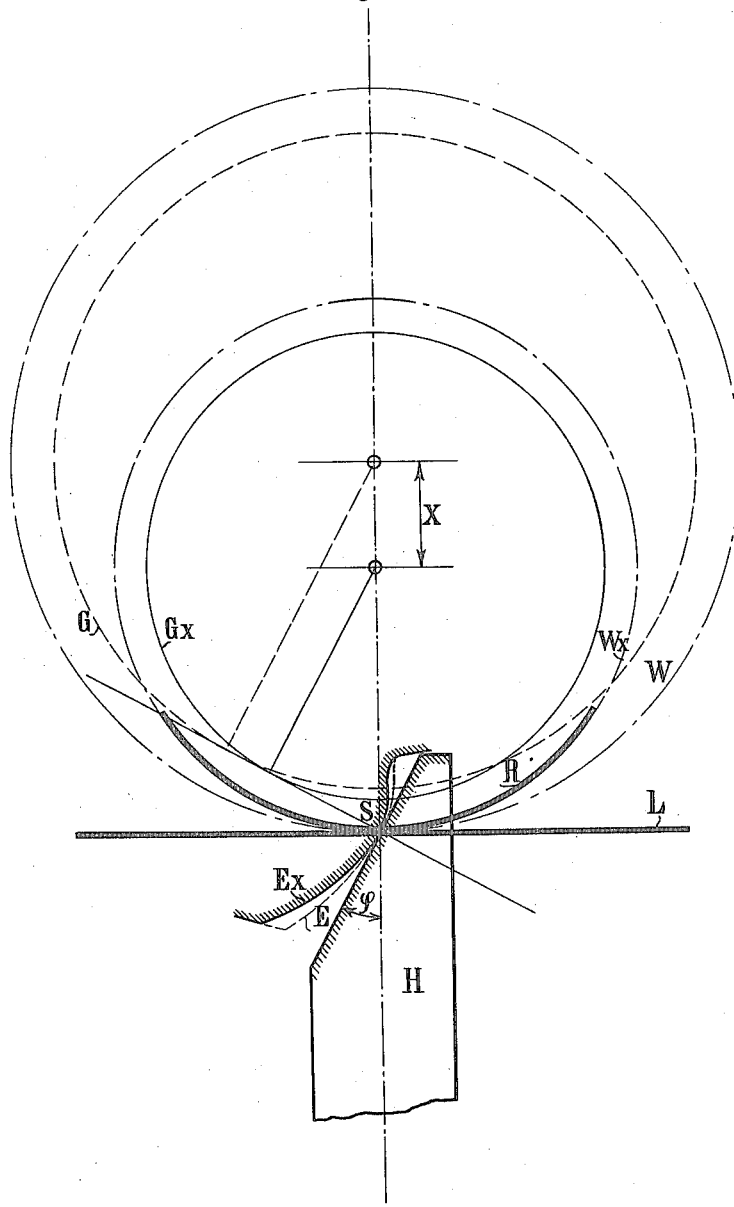

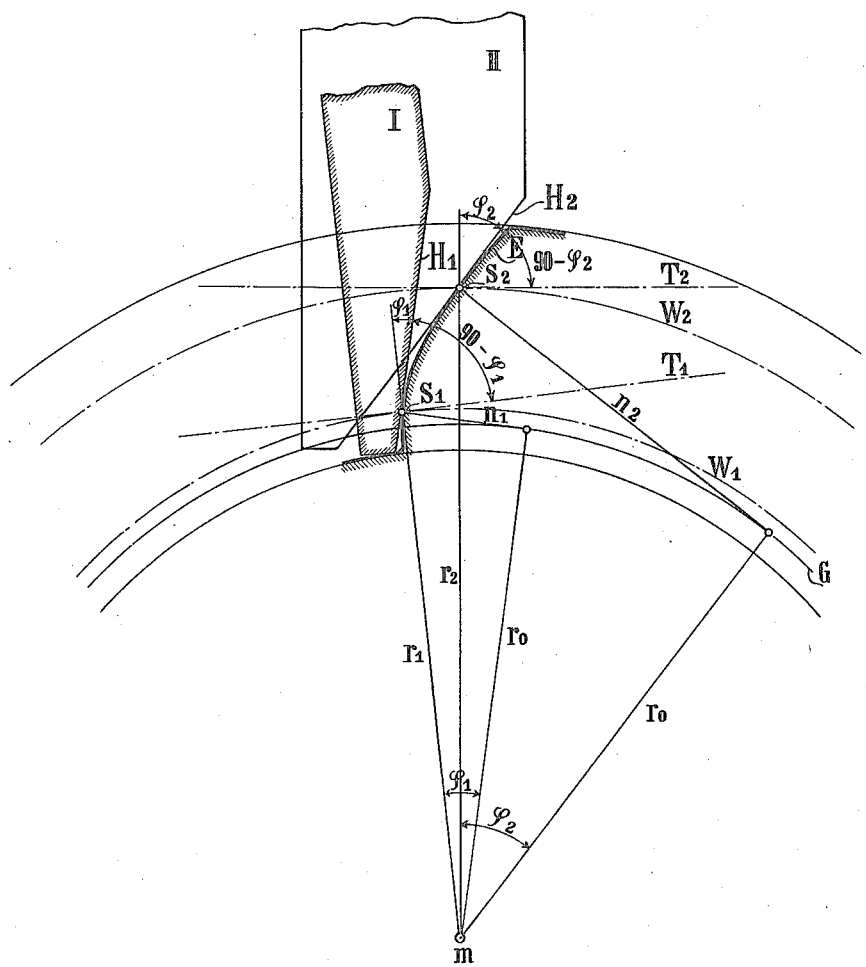

MAX MAAG, OF ZURICH, SWITZERLAND.

CUTTING GEAR-TEETH.

1,184,975.  Specification of Letters Patent.  Patented May 30, 1916.

Application filed July 25, 1912. Serial No. 711,418.

*To all whom it may concern:*

Be it known that I, MAX MAAG, a citizen of Switzerland, residing at Rämistrasse 5, Zurich, Switzerland, have invented certain new and useful Improvements in or Relating to Cutting Gear-Teeth, of which the following is a specification.

This invention relates to the production of involute teeth of any pitch and angle of engagement.

In the drawings, Figure 1 is a diagram illustrating the operation of generating involute gear teeth when rolling circles of different radii are used in connection with tools with a fixed angle of inclination of the cutting edge, and Fig. 2 is a diagram illustrating the operation when tools with cutting edge angles, bearing a certain definite relation to the radii of the rolling circles, are used.

As is well known, by means of the known machines for manufacturing involute teeth, which work on the so-called rolling process and employ tools formed as toothed racks, in which the relative rolling movement between the wheel to be produced and the generating toothed rack is obtained by causing a rolling curve R secured to the wheel, to roll on a bar L (Fig. 1), theoretically correct involute shapes can be obtained only when the radius of the rolling curve or arc is exactly equal to the radius of the generating rolling circle obtained by calculation. As however on the one hand the rolling circle may be of any desired size, according to the number of teeth, pitch and angle of engagement of the wheel to be produced, and as on the other hand, only a limited number of rolling arcs of graduated size are available, it is generally necessary to use rolling arcs of a greater or smaller radius than the radius of the theoretical rolling circles. The process is then such that the center of the rolling arc is advanced until the rolling arc touches the bar L at the point S at which the correct theoretical rolling circle would touch it. The rolling between the wheel and the toothed rack (the latter is indicated in the figure by the tool H with a cutting edge angle $\varphi$) then takes place on a circle $W_x$ eccentric to the amount $x$ relatively to the rolling circle W. Instead of the involute E corresponding to the proper base circle G, there is therefore produced the involute $E_x$ corresponding to the base circle $G_x$ which corresponds to the only approximately correct rolling circle $W_x$. The involute $E_x$ agrees however with the involute E only at the point S, while all the points of the curve $E_x$, situated inside or outside the rolling circle, differ from the involute E, to a greater extent the greater the difference of the radii of the rolling arc used and of the theoretical rolling circle. With reference to the base circle G corresponding to the regular rolling circle W, the curve $E_x$ is of course not an involute, nor is it a correct tooth curve, and for that reason cannot work properly either with involute shapes produced in the same manner, or with correct involute shapes, of any desired other wheel of the same pitch. It is however well known that even infinitesimal deviations of tooth shapes from the theoretically correct shape, bring about considerable accelerations and retardations in the working of driven wheels, in case of large circumferential speeds of wheels working together, and these accelerations and retardations result in an irregular and noisy working.

According to this invention, theoretically correct involute teeth can be produced even on machines working by the process described, without it being necessary to shift the rolling arcs from the center, or as might be thought, to increase their number. On the contrary, according to this invention, the rolling circle is brought in every case to agree with an existing rolling arc, this being effected by a corresponding modification of the angle of the cutting edge of the generating tool.

As will be seen from Fig. 2, it is possible to generate the involute E belonging to the base circle G by rolling the straight line $T_1$ with the cutting edge $H_1$ (assumed to be firmly secured to it) of the tool I, on the rolling circle $W_1$ as well as by rolling the straight line $T_2$ with the cutting edge $H_2$ of the tool II (assumed to be secured to it), on the rolling circle $W_2$ as will appear from the following considerations: The rolling movement of the straight line $T_1$ on the rolling circle $W_1$ can be replaced, as is well known, by a rotation of the circle $W_1$ about its center $m$ and a simultaneous shifting of the straight line $T_1$ in its direction, with a constant speed and in the same direction as the circumferential speed of the rolling circle $W_1$ at the point $S_1$. These are however the exact cinematic conditions for the coöperation of a toothed rack, indicated by the cutting edge $H_1$, and the straight line $T_1$, with a toothed wheel with a pitch circle $W_1$. This coöperation of toothed rack and toothed wheel is utilized in the rolling process in a known manner for generating the tooth shapes on a wheel to be machined, that is, the straight cutting edge $H_1$ produces the involute E for that circle G to which the line $n_1$ drawn at the point $S_1$ normally to the cutting edge $H_1$ is tangential. $H_1$ is then of course tangential to the involute produced.

If now the cutting edge $H_2$ of a tool II is placed tangentially at any desired point, for instance $S_2$ of the involute E, and a circle $W_2$ as well as a tangent $T_2$ to the same, are drawn through the said point, this will again produce the cinematic conditions for the coöperation of a toothed rack indicated by the straight cutting edge $H_2$ and the line $T_2$, with a wheel of a pitch circle $W_2$ and by rotating the wheel about $m$ and shifting the cutting edge $H_2$ in the direction of $T_2$ to an extent corresponding to the circumferential speed of the circle $W_2$, we will again obtain the involute for the circle to which the line $n_2$ drawn at $S_2$ normally to $H_2$ is tangential. As however $H_2$ is made tangential to the involute E, its normal line $n_2$ at the point $S_2$ is normal to the involute and as such, it is again tangential to the base circle G of the involute E, as all the normal lines of an involute are, as is known, tangential to the base circle of the same. As moreover each circle has only one involute, or as all involutes of one circle are congruent, it will be obvious that the same involute E for the base circle G will be produced both by rolling $T_1$ on $W_1$, $H_1$ being assumed to be secured to $T_1$, and by rolling $T_2$ on $W_2$, $H_2$ being also assumed to be secured to $T_2$, so that the invention may be generally characterized as follows: Each involute of a circle can be produced by means of rolling circles of any desired size provided that the cutting edge of the generating tool is arranged tangentially to the involute at the point at which the rolling circle used intersects the involute, and the said cutting edge participates in the movement of the tangent to the rolling circle assumed to be secured to said cutting edge at the point of intersection of the rolling circle with the involute, when the said tangent is rolled on the rolling circle.

As will be seen, the chief point in working with rolling circles of any desired size is to arrange the cutting edge of the generating tool tangentially to the involute to be produced, that is at the point at which the rolling circle used ($W_1$ or $W_2$) intersects the involute. As however it is practically immaterial at which point of the circumference of the wheel the involute is started, the problem may be reduced to determining the angle of inclination $90-\varphi_1$, or $90-\varphi_2$ of the cutting edge or of the involute, which the latter makes with the toothed rack pitch line $T_1$ or $T_2$, or the cutting edge angle $\varphi_1$, or $\varphi_2$ which the cutting edge $H_1$ or $H_2$ makes with the normal lines $mS_1$, $mS_2$ drawn from $m$ to the pitch line $T_1$ or $T_2$. This is however very easily done from the relations shown in Fig. 2 between the angle $\varphi_1$ or $\varphi_2$ of the cutting edge, the radius $r_1$ or $r_2$ of the rolling circle $W_1$ or $W_2$ used, and the radius $r_0$ of the base circle of the involute E;

$$\text{Cos. } \varphi_1 = \frac{r_0}{r_1} \text{ and cos. } \varphi_2 = \frac{r_0}{r_2}$$

or generally $$\text{Cos. } \varphi_x = \frac{r_0}{r_x}$$

in which $\varphi_x$ indicates the angle of the cutting edge, corresponding to any desired rolling circle of the radius $r_x$.

The interdependence of $\varphi_x$ and $r_x$ can also be written as follows:

$$r_x = \frac{r_0}{\cos. \varphi_x}$$

This equation means that, by changing in any desired manner the angle of the cutting edge, rolling circles of any desired size can be rendered suitable, that is to say, even those, the radii of which are the same as the radii of existing rolling arcs. By suitably choosing the angle of the cutting edge of the tool, the rolling between the rolling arc and the bar L can therefore always take place on an exactly correct rolling circle, and will always give theoretically correct involutes for the base circle corresponding to the proper rolling circle and to the angle of the cutting edge.

If, as hitherto in machining wheels working together by the rolling process it was considered as being the general law, the cutting edge angle of the generating tool is invariable, the proportion $$\frac{1}{\cos. \varphi}$$

will also be invariable. If moreover, $r_0$ or $R_0$ are the radii of the base circles of the involutes of a given pair of wheels, such circles, in accordance with the well known laws as the teeth, are always circles of equal circumferential velocity during the running of the wheels in question. From the equations $$r = \frac{r_0}{\cos. \varphi} \text{ and } R = \frac{R_0}{\cos. \varphi}$$

it follows that the rolling circles of coöperating wheels of the radii $r$ or $R$, are circles of equal circumferential velocity as circles of equal circumferential velocity will still possess equal circumferential velocity even when their radii are multiplied by any desired factor (in our case $$\frac{1}{\cos.\varphi}\Big).$$

In the new process, each involute, and therefore also each pair of involutes of proper teeth, can however be generated by means of rolling circles of any desired size. The proportions $$\frac{1}{\cos.\varphi_x} \text{ and } \frac{1}{\cos.\varphi_y}$$

(in which $\varphi_x$ indicates any desired angle of cutting edge, at which one wheel of a pair is generated, and $\varphi_y$ any desired angle of cutting edge at which the other wheel of the pair is generated) can then assume any desired values so that the radii $$r_x = \frac{r_o}{\cos.\varphi_x} \text{ and } R_y = \frac{R_o}{\cos.\varphi_y}$$

of the corresponding rolling circles no longer belong to the circles of equal circumferential velocity, although of course even in the case of these teeth, the base circles with the radii $r_o$ and $R_o$ have the same circumferential velocity, as $r_o$ and $R_o$ are in this case multiplied by completely independent factors of different size $$\frac{1}{\cos.\varphi_x} \text{ or } \frac{1}{\cos.\varphi_y}$$

The difference between the old rolling process and the new one according to this invention, can be therefore described as follows: In the generation of teeth for a set of wheels by means of an invariable angle of cutting edge, the rolling circles must be always circles of equal circumferential velocity, while for manufacturing the same teeth by means of a variable angle of cutting edge, rolling circles of any desired size can be used, which, during the running of the said wheels, would not be circles of equal circumferential velocity.

It is obvious that, according to the new process, it is possible to produce even on machines using rolling arcs, theoretically correct involute teeth for any desired pitch and angle of engagement with a limited number of rolling arcs, as in spite of the fact that the teeth in question can have base circles of any desired size, the rolling circles can be selected as desired, by suitably altering the angle of generating cutting edge. It is also clear that the process is also applicable to machines in which the rolling circles are not represented by rolling arcs, but are fixed by giving the wheel, by means of a change wheel mechanism or the like, such an angular velocity that the theoretical rolling circle receives the same circumferential velocity as the cutting edge of the tool moving in a straight line. The essential point is the use of any desired circles as rolling circles for coöperating wheels, which circles during the proper working of the wheels in question, would not be circles of equal circumferential velocity and the modification of the angle of cutting edge of the generating tool in accordance with the proportions $$\frac{\text{pitch circle radius of one wheel}}{\text{radius of any desired rolling circle}} = \frac{r_o}{r_x} = \cos.\varphi_x$$

and $$\frac{\text{pitch circle radius of the other wheel}}{\text{radius of any desired rolling circle}} = \frac{R_o}{R_y} = \cos.\varphi_y$$

Finally it must be pointed out that the process for producing involute teeth can be used both for spur and bevel and screw wheels as in bevel and screw wheels, the tooth construction circles determined $\varphi$ in the known manner must be used for calculating the base circles.

What I claim as my invention and pray to secure by Letters Patent is:—

The process of generating involute gear teeth of correct curvature on a given base circle, which consists in giving the blank a rolling motion on a circle which differs in diameter from its pitch circle, and adjusting the intermeshing cutting tool so that the cosine of the angle of inclination of its cutting edge with the normal to the pitch line of the imaginary rack, represented by said edge, is equal to the ratio between the radii of said base circle and the rolling circle used.

In witness whereof I have hereunto signed my name this 8th day of July, 1912, in the presence of two subscribing witnesses.

MAX MAAG.

Witnesses:
HENRY A. McBRIDE,
Q. A. GASER.